UNITED STATES PATENT OFFICE.

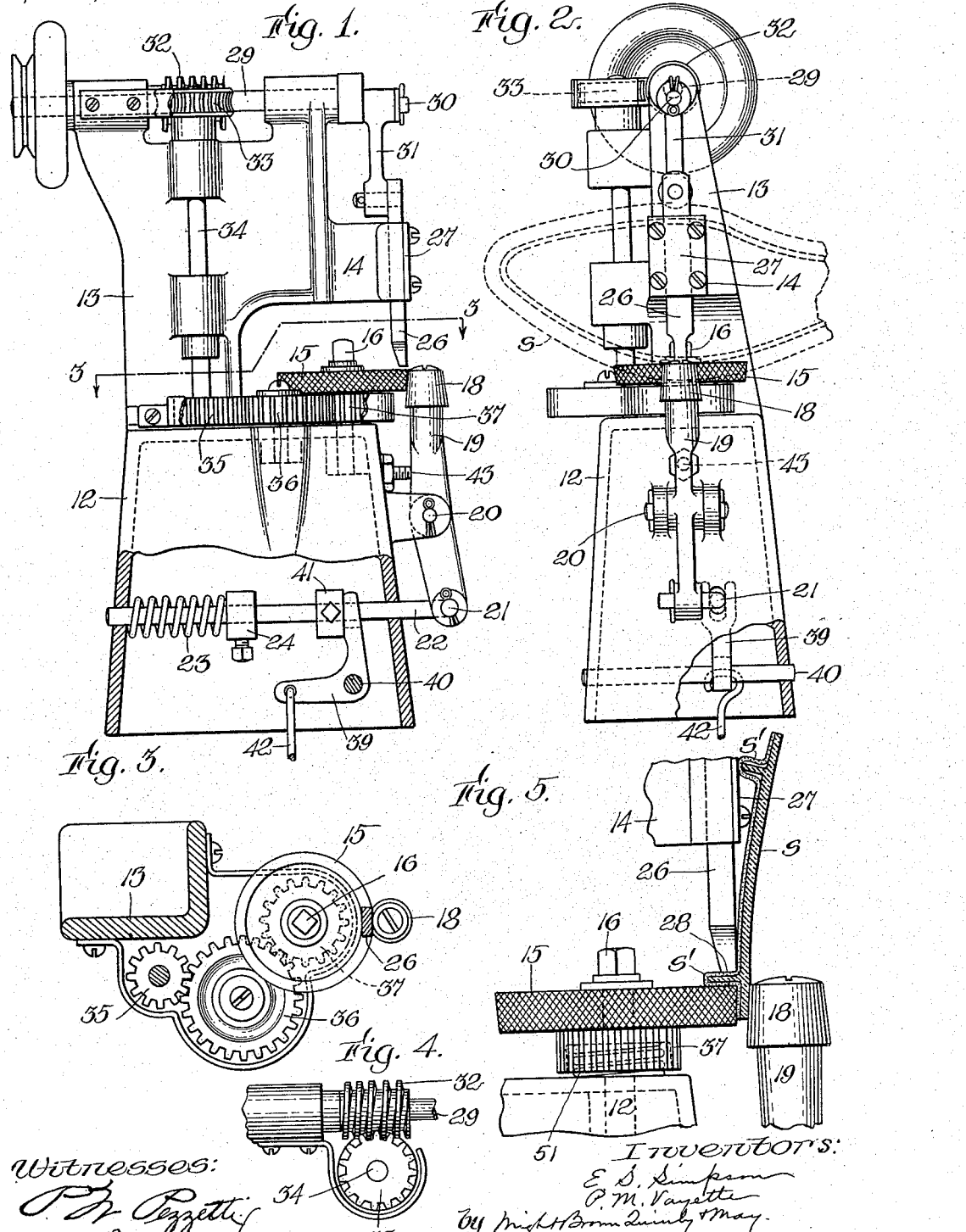

EDMUND S. SIMPSON, OF NORTH SCITUATE, AND PETER M. VAYETTE, OF QUINCY, MASSACHUSETTS, ASSIGNORS TO CLIFTON MANUFACTURING COMPANY, OF JAMAICA PLAIN, MASSACHUSETTS, A CORPORATION OF NEW JERSEY.

MACHINE FOR COMPACTING PARTS OF REINFORCED INNERSOLES.

1,174,095. Specification of Letters Patent. Patented Mar. 7, 1916.

Application filed May 1, 1912. Serial No. 694,314.

*To all whom it may concern:*

Be it known that we, EDMUND S. SIMPSON and PETER M. VAYETTE, citizens of the United States, and residents, respectively, of North Scituate, in the county of Plymouth, and of Quincy, in the county of Norfolk, State of Massachusetts, have invented certain new and useful Improvements in Machines for Compacting Parts of Reinforced Innersoles, of which the following is a specification.

This invention relates to means for compressing the edge portion and the lip of an innersole composed of a body usually of leather and provided on one side with an integral, outwardly turned lip, and a reinforcing layer usually of textile fabric such as duck or canvas, cemented to one side of the body and covering the lip thereof, the reinforcing layer forming a casing which reinforces the lip. In assembling the said parts the reinforcing layer is conformed as closely as possible to the body lip, but the assembling appliances now in use do not press the portions of the reinforcing material which cover the sides of the lip into desirably close contact with the sides of the lip and into the angles formed at the intersection of the lip with the adjacent surface portions of the body at opposite sides of the lip, portions of the reinforcing layer being left slightly out of contact with the surfaces of the sole and lip at said angles.

Our invention has for its object to provide a machine for following up the means whereby the reinforcing layer is originally applied to the body and lip, and pressing the reinforcing material closely against the sides of the lip and into the angles formed by the lip and the adjacent surfaces of the body.

The invention is embodied in a machine comprising pressing and feeding members adapted to press the portions of the reinforcing layer which cover the sides of the lip closely against the lip and into the said angles and to feed the sole progressively during the operation until the entire lip is laterally compressed and the layers thereof are firmly united, the edge portion of the sole being incidentally compressed at the same time.

Of the accompanying drawings:—Figure 1 represents a side elevation of a machine embodying our invention; Fig. 2 represents an end elevation of the same; Fig. 3 represents a section on line 3—3 of Fig. 1, and a plan view of parts below said line; Fig. 4 represents a detail hereinafter referred to; Fig. 5 represents an enlargement of parts of Fig. 1, and a transverse section of an innersole under treatment by the machine.

The same reference characters represent the same parts in all the figures.

In the drawings 12 represents the base portion of the frame of the machine and 13 a standard thereon having an arm 14 overhanging a portion of the base.

15 represents a feed wheel mounted to rotate on a vertical stud 16 attached to the base and having a flat upper surface substantially at right angles with its axis. The periphery of the wheel 15 is preferably milled or knurled and slightly tapered, so that its intersection with the flat upper surface forms an acute angle, as shown by Fig. 5, although this angle may be varied if desired.

The feed wheel is slowly rotated by mechanism hereinafter described to feed an innersole S presented to the machine. The body of the innersole has the usual integral lip, said lip and the side of the body from which it projects being covered by the usual cloth reinforcing layer cemented to the body and lip, a reinforced lip S' composed of an inner portion and a casing portion being thus formed. When the parts of the innersole are first assembled the reinforcing layer stands out somewhat from portions of the sides of the body lip and from adjacent portions of the side of the body, as indicated at the upper part of Fig. 5. The edge portion of the sole is placed against the periphery of the feed wheel and the outer side of the reinforced lip is placed on the upper surface of the feed wheel, as shown by Fig. 5.

18 represents a pressure roll journaled on a lever 19 which is fulcrumed at 20 and is connected at 21 with a rod 22 adapted to slide endwise in guides formed in the base 12. A spring 23 on said rod exerts pressure on a collar 24 affixed thereto, in the direction required to press the roll 18 yieldingly toward the periphery of the feed wheel 15. The edge portion of the sole is grasped between the wheel 15 and roll 18, so that the rotation of the wheel feeds the sole progressively. The angle of the feed wheel formed by the intersection of its periphery and upper side presses the reinforcing layer closely into the angle formed by the outer side of the body lip and the adjacent face of the sole body, the edge portion of the sole being at the same time laterally compressed or compacted.

26 represents a pressing member which is preferably a bar or slide movable in a guide 27 on the arm 14, toward and from the upper surface of the feed wheel, and is provided with a narrow pressing end face 28, formed and arranged to press the portion of the reinforcing layer on the inner side of the body lip closely into the angle formed by said inner side and by the adjacent side of the sole body, as shown by Fig. 5.

The feed wheel 15 and pressing member 26 are moved simultaneously, the wheel being rotated and the pressing member reciprocated, by the mechanism next described.

29 represents a driving shaft journaled in bearings on the standard 13 and having an eccentric wrist pin 30 which is connected by a rod or link 31 with the pressing member 26. Said shaft has a worm 32, Fig. 4, meshing with a worm wheel 33 on a vertical shaft 34 journaled in bearings on the standard 13. To the lower end of the shaft 34 is attached a gear 35 which is connected by an intermediate gear 36 with a gear 37 attached to the feed wheel 15. Connections are thus provided between the driving shaft 29 and the feed wheel and the pressing member 26, the rotation of the feed wheel being so timed relatively to the reciprocating motion of the pressing member 26 that the pressing face 28 acts to compress throughout its length the portion of the reinforced lip on which it bears. In practice the feed wheel is rotated about seventy-five times per minute, while the pressing member 26 is reciprocated at the rate of about fifteen hundred strokes per minute.

Means are provided for retracting the pressure roll 18 from the periphery of the feed wheel, said means, as here shown, including a bell crank lever 39, fulcrumed at 40, in the base 12, one arm of said lever bearing on a collar 41 on the rod 22, and the other arm being connected by a rod 42 with a treadle (not shown). An adjustable stop 43 may be provided to limit the movement of the pressure roll toward the feed wheel.

The sole is applied to the feed wheel when the pressing member 26 is raised and the pressure roll 18 retracted. The release of the pressure roll causes a conformation of the portions of the reinforcing layer in contact with the upper side and periphery of the feed wheel, to the outer side of the body lip and the adjacent surface of the body. The reciprocating motion of the pressing member 26 causes a corresponding conformation of the portion of the reinforcing layer on which it bears to the inner side of the lip and the adjacent surface of the body. The rotation of the feed wheel causes the conformation to extend progressively along the entire reinforced lip, the sole being guided and held entirely by the machine, without attention by the operator after the application of the sole to the machine. It will be seen that the upper side of the feed wheel and the pressing end face of the member 26 constitute faces of positive pressure members which operate to compact the reinforced lip and reduce the thickness of its base portion. In other words, said members change the reinforced lip from the condition shown at the upper part of Fig. 5 to that shown at the lower part of said figure.

The pressure roll 18 constitutes a yielding pressure member which coöperates with the positive pressure members in the compacting operation.

We do not limit ourselves to the particular form of the positive and yielding pressure members here shown, and may variously modify the same to produce the described result without departing from the spirit of the invention. The mechanism which imparts relative movement to the positive pressure members may also be varied from that here shown.

The feed wheel is preferably supported by a relatively strong spring 51 so that it is adapted to yield slightly in a downward direction sufficiently to compensate for variations in the thickness of different reinforced lips. The only object of this yielding support is to enable the machine to act on lips of various thicknesses without liability of injury to the machine or to the work, or to both, when a lip of maximum thickness is under treatment. For all practical purposes the feed wheel is positively supported against the pressure of the pressing member 26.

It will be observed that in the construction illustrated the lip-supporting surface is horizontal and the surfaces between which the edge of the sole is received are substantially vertical, thus causing the sole while being acted upon to occupy a nearly vertical plane, as shown in Figs. 2 and 5, and keeping it out of contact with the machine at practically all points except at the edge portion of the sole. This arrangement is of importance in facilitating the automatic feeding of the sole without assistance by the operator, and it also presents the sole-feeding and lip-pressing members in such relation that ample space is available for these parts without crowding, and without employing obliquely-arranged feed shafts such as are found in various prior machines for the same purpose, our apparatus being relatively simple in construction and capable of operating effectively at a high speed.

We claim:—

1. A machine for compacting portions of reinforced innersoles, comprising a feeding member having a horizontally-moving top surface adapted to support an innersole lip and also having a lateral feed surface adapted to engage the edge of the sole, a laterally-yielding pressure member opposed to said feed surface and rotatable on a substantially vertical axis, a positive pressure member opposed to said lip-supporting surface, and means for relatively moving said feeding member and positive pressure member to cause the simultaneous compression of the sole edge and sole lip, and a feeding movement of the sole.

2. A machine for compacting portions of reinforced innersoles, comprising a feed wheel rotatable on a vertical axis and having a peripheral feed surface and a lip-supporting top surface adjacent to its periphery, a laterally-yielding pressure member opposed to said peripheral feed surface, a positive pressure member opposed to said lip-supporting surface, and means for relatively moving said wheel and positive pressure member to cause the simultaneous compression of a sole edge and a sole lip, and a feeding movement of the sole.

3. A machine for compacting portions of reinforced innersoles, comprising a feed wheel rotatable on a vertical axis and having a peripheral feed surface and a lip-supporting top surface adjacent to its periphery, a laterally-yielding pressure member opposed to said peripheral feed surface, a positive pressure member movable toward and away from said lip-supporting surface, and means for simultaneously rotating the feed wheel and reciprocating the positive pressure member.

4. A machine for compacting portions of reinforced innersoles, comprising a feed wheel rotatable on a vertical axis and having a peripheral feed surface and a lip-supporting top surface adjacent to its periphery, a pressure roll yieldingly pressed toward said peripheral feed surface and rotatably mounted on an axis substantially parallel to the axis of the feed wheel, a positive pressure member movable toward and away from said lip-supporting surface, means for simultaneously rotating the feed wheel and reciprocating the positive pressure member, and means for retracting the pressure roll from the periphery of the feed wheel.

5. A machine for compacting portions of reinforced innersoles, comprising a feed wheel having a peripheral feed surface and an adjacent lip-supporting surface extending transversely to the axis of the wheel, means providing for a slight yielding movement of said feed wheel in a direction parallel to its axis, means for pressing a sole edge against said feed surface, a positive pressure member movable toward and away from said lip-supporting surface, and means for simultaneously rotating the feed wheel and reciprocating the positive pressure member.

In testimony whereof we have affixed our signatures, in presence of two witnesses.

EDMUND S. SIMPSON.
PETER M. VAYETTE.

Witnesses:
C. F. BROWN,
P. W. PEZZETTI.

Copies of this patent may be obtained for five cents each, by addressing the "Commissioner of Patents, Washington, D. C."